Dec. 30, 1952

F. H. FODOR 2,623,953

SOUND REPRODUCTION APPARATUS

Filed April 9, 1949

2 SHEETS—SHEET 1

INVENTOR.
FERENZ H. FODOR
BY
ATTORNEY

Dec. 30, 1952 F. H. FODOR 2,623,953

SOUND REPRODUCTION APPARATUS

Filed April 9, 1949 2 SHEETS—SHEET 2

INVENTOR.
FERENZ H. FODOR
BY
ATTORNEY

Patented Dec. 30, 1952

2,623,953

UNITED STATES PATENT OFFICE 2,623,953

SOUND REPRODUCTION APPARATUS

Ferenz H. Fodor, Los Angeles, Calif., assignor to Filmtone, Inc., Los Angeles, Calif., a corporation of California Application April 9, 1949, Serial No. 86,415

12 Claims. (Cl. 179—100.3)

The present invention relates generally to sound reproducing apparatus of the type utilizing a record strip or a ribbon of suitable material upon which a sound track may be impressed, and which can thereafter be transcribed and audibly reproduced.

Briefly, such apparatus in general embodies means whereby a plurality of sound recordings carried in substantially parallel longitudinal relation on a strip such as a film may be continuously reproduced without the necessity of employing separate reproducing heads or devices, and without the necessity of changing reels. The film is moved through apparatus including transcribing means which may consist of a light source and reproducing pick-up, and means are provided whereby the film or other instrumentality automatically causes the direction of travel of the film to be reversed at the end of a sound record track and a relative shifting of a scanning beam so as to cause the scanning beam to be directed through an adjoining or desired sound record track onto the reproducing pick-up.

Generally stated, the present invention contemplates improvements in the apparatus disclosed and described in detail in my Patent No. 2,254,478, entitled, Method of Sound Reproduction and Apparatus Therefore, issued on September 2, 1941. In the patented structure, the strip is retained against the advancing drum by suction which is applied on either side of each of the parallel extending sound tracks. The suction areas are therein obtained by providing a plurality of axially spaced disc members extending between the advancing drum ends. Such an arrangement necessitated placing the scanning beam off-center with respect to the drum, the record strip thus being so disposed with respect to the scanning beam that certain distortional effects resulted in the reproduced record.

The present invention seeks to improve my patented apparatus and has for one object the provision of improved pneumatic means for forcibly pressing the lateral margins of the record strip against drum areas containing suction ports, and in the provision of novel means for rendering the pneumatic means ineffectual at points in the drum periphery at which the record strip is led onto and off of the drum.

A further object of the invention is to provide an improved hollow drum construction for supporting and advancing the record strip, the drum being so arranged that the scanning light beam may be directed toward the drum center of rotation so as to pass through the record strip in a normal direction which will substantially eliminate distortions which might otherwise be caused by the record strip being tilted with respect to the scanning beam axis.

Another object of the present invention is to provide improved means within the periphery of the strip advancing drum for dividing the scanning beam and directing portions thereof on opposite sides of the axis of rotation of the strip advancing drum to separate pick-up devices, whereby one portion of the divided scanning beam may be utilized for audibly reproducing the sound strip record and the other portion may be utilized for controlling the movement of the record strip as described in my co-pending application, Serial No. 86,416, filed April 9, 1949, entitled, Control System for Sound Reproduction and Recording Apparatus, now Patent No. 2,550,007.

Still another object of the present invention is to provide improved switching means for controlling reversal of the direction of drum rotation and consequently the direction of record strip travel, such switching means being arranged for actuation by the strip or some medium carried thereby, after the strip has assumed a position off the strip advancing drum.

Further objects of the invention will be brought out in the following part of the specification, wherein detailed description is for the purpose of fully disclosing the invention without placing limitations on the scope of the invention defined in the appended claims.

Referring to the drawings which are for illustrative purposes only:

Figures 1, 2:
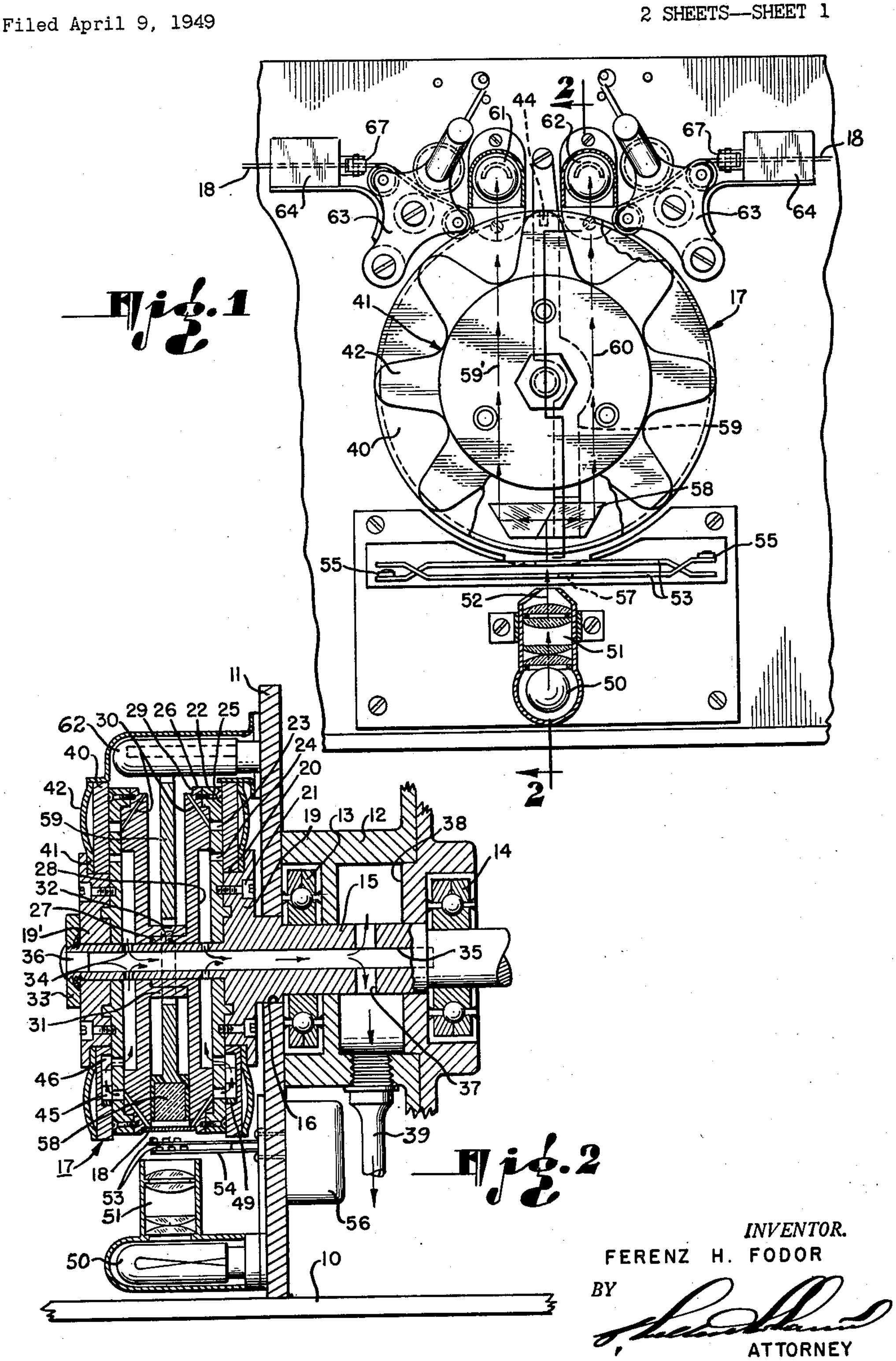
Fig. 1 is a front elevational view of apparatus embodying the features of the present invention, parts being cut away and shown in section to illustrate certain features.
Fig. 2 is a vertical section through the same, taken substantially on line 2—2 of Fig. 1.

Referring now to the drawings, for illustrative purposes there is shown in Figs. 1 and 2, apparatus embodying the features of the present invention. The various parts of the apparatus are supported upon a suitable frame structure which in the present instance has been illustrated as including a base member 10 to which there is secured an upright panel 11. A bearing housing 12 is supported on the rear face of the panel 11 and is provided with spaced anti-friction bearing assemblies 13 and 14 which rotatably support a hollow shaft 15 in a horizontal position extending through an opening 16 in the panel 11. The shaft 15 is rearwardly extended and is adapted to be connected to suitable driving means (not shown), but which should be so arranged that it may be utilized to drive the shaft 15 in reversed directions of rotation.

On the forward side of the panel 11, the shaft 15 carries a hollow drum structure, as generally indicated at 17, for holding and advancing the record strip 18 which is trained around a portion of the drum periphery, as will hereinafter be more fully explained. This drum comprises essentially similar end assemblies having similar parts, except that the parts are arranged in reversed order.

The inner assembly comprises a flange 19 which is inwardly spaced from the outer end of the shaft 15 and integrally formed therewith, this flange having a circumferentially extending open sided groove 20 along its outer peripheral edge. The flange 19 is connected as by screws 21 with a seating disc member 22 which extends beyond the periphery of the flange 19 and closes the open side of the groove 20.

Figure 3:
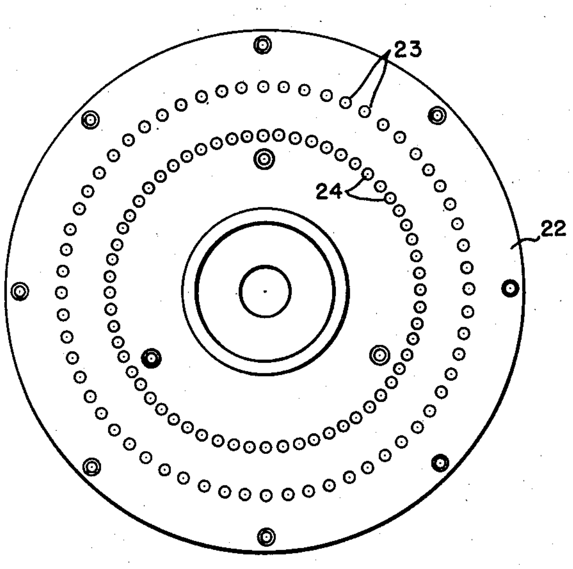
Fig. 3 is a face view of a valve seating disc as used in the device.

As shown in Fig. 3, the seating disc member is provided with an outer circle of openings 23 and an inner circle of openings 24 which extend entirely through the seating member and are in communication with its opposite faces. The openings 23 and 24 are so spaced circumferentially that each outer opening cooperates with an inner opening to form a pair of openings.

The seating disc member 22 is interconnected at its periphery by screws 25 or by other suitable means to an inner drum end 26 having a projecting hub portion 27 adapted to surround the shaft 15. The opposite side of the drum end 26 is undercut to form in mounted position on the shaft a circumferentially extending channel 28. It will be noted that one side of this channel is closed by the associated seating disc member 22. At its peripheral outer edge, the drum end 26 has formed therein an open sided groove 29 adapted to receive and support therein one edge margin of the record strip. A plurality of passageways 30 in circumferentially spaced relation around the drum end member 26 interconnect with one of the openings 23 at one end and at its other end opens into the bottom of groove 29 to provide a plurality of suction ports therealong. It will be observed that the openings 24 of the seating disc are in communication with channel 28.

The outer assembly parts are of similar construction to those of the inner assembly, except that the drum end in this case is provided with a hub portion 31 of sufficient size to slip over the hub portion 27 of the other drum end, these hub portions being secured together as by a screw 32 and serving to maintain the inner and outer drum end members in proper spaced relation. A ring member 19′ is of similar construction to the flange 19, except that instead of being integrally formed with the shaft 15, the member 19′ is separately formed. The member 19′ is, however, secured to an associated seating disc member 22 as previously discussed in connection with the inner drum assembly. A retaining nut 33 is threaded onto the end of shaft 15 and is tightened against the outer surface of ring member 19′.

From the foregoing description, it will be readily appreciated that the grooves 29—29 of the drum end members provide surfaces for engaging the marginal edge surfaces of the record strip, and that the surfaces of the drum grooves have suction ports which will provide pneumatic pressure for retaining the record strip against slippage, when the passageways 30 are connected with a suitable source of suction. For such purpose, the channels 28—28 of the inner and outer drum assemblies are respectively connected through openings 34 in the wall of the hollow shaft 15 which connect with the inner bore 35 thereof. The outer end of the shaft 15 is closed by a plug 36 and is connected adjacent its other end by openings 37 with an annular channel 38 in the bearing housing 12. This channel 38 is connected with a conduit 39 leading to a suitable source of suction (not shown).

In order to permit separation of the marginal portions of the record strip from the grooves 29—29 at the points of entering and leaving of the record strip with respect to the hollow drum 17, valve means are provided for shutting off the suction ports between the entering and leaving points of the record strip at the top of the drum. For such purpose, there is mounted in each of the grooves 20, a valve ring member 40 having face engagement with the marginal face area of the seating disc 22 containing the openings 23 and 24. The valve ring member is biased toward the associated seating disc by means of an annular spring member 41 having a plurality of angularly disposed resilient arms 42 adapted at their outermost ends to bear against the valve ring member.

Figure 4:
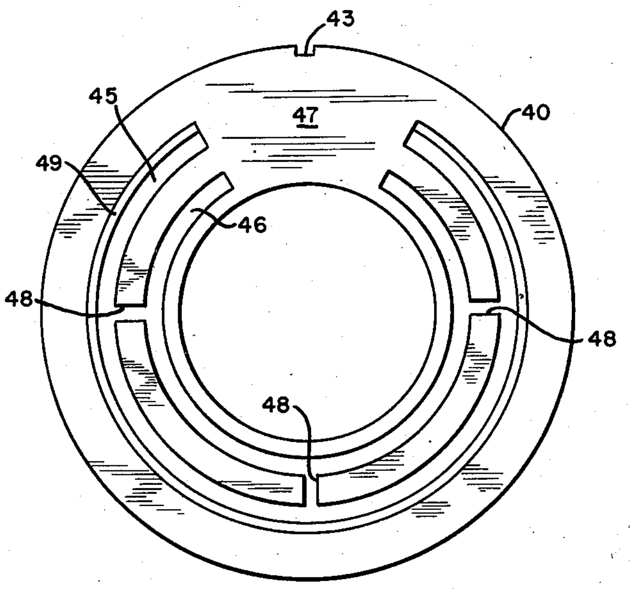
Fig. 4 is a detail view looking towards the seating surface of the valve ring as utilized in the present invention.

Referring to Fig. 4, the valve ring member is provided in its upper edge with a key slot 43 adapted to receive a suitable retaining key 44, as shown in Fig. 1, for restraining the valve ring member against rotational movement. In the face surface of the valve ring member which is associated with the confronting face of a seating disc member 22, there is a pair of radially spaced concentric grooves 45 and 46 having their ends terminated in 60° angular relation at the top of the valve ring member so as to define a sector-shaped face portion 47. The grooves 45 and 46 are interconnected at spaced intervals by radial passages 48. The outermost groove 45 has mounted therein a bearing open-ended ring 49, the exposed edge of which is adapted to bear against the confronting face of the seating disc member with which it is associated. As shown in Fig. 2, it will be noted that the outer circle of openings 23 communicate with groove 45, and the openings 24 of the inner circle of openings communicate with groove 46, except at such times as the pairs of openings 23 and 24 may lie within the face portion 47 of the valve ring member. In this position of the openings, communication between the openings of each pair is cut off, and there cannot at this time be any flow between these openings as would be possible between the openings which are connected with the grooves 45 and 46, namely, through the radial passages 48.

Figure 5:
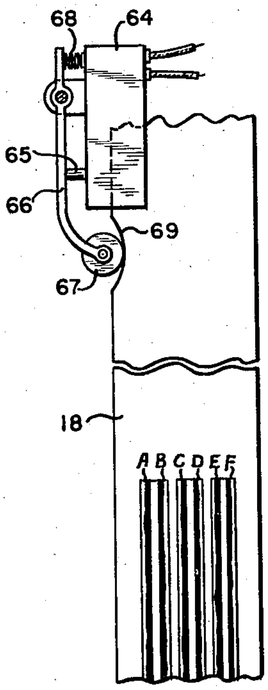
Fig. 5 is a fragmentary view of an end portion of a record strip adapted to be used in the apparatus of the present invention, showing one manner of utilizing the strip to actuate a control switch.

Referring to Fig. 5, the record strip 18, for purposes of illustration, is disclosed as being of the film type upon which there is impressed six sound tracks A to F, inclusive, which extend longitudinally of the strip in parallel relation. It is contemplated, however, that other strip materials such as paper or the like may be utilized, and that the sound track may be of other conventional types such as that which may be magnetically modulated. Since the apparatus is arranged to transcribe first one sound track, and then at the end of this sound track to be automatically or otherwise shifted to the next sound track which is then transcribed, the direction of strip movement being reversed at this time, means are provided for automatically effecting a relative shifting movement between the record strip and the pick-up means. For purposes of illustration, the present apparatus is arranged to operate in a similar manner to that more specifically disclosed in my Patent No. 2,254,478, issued September 2, 1941.

As shown in Figs. 1 and 2, a light source 50 is positioned at the bottom of the hollow drum 17, this light source being associated with a suitable optical system 51 by means of which a light beam is directed along an axis 52 in a direction toward the center of rotation of the drum, so that this beam will pass through a record strip carried by the drum in a direction normal thereto. The present invention differs in this respect from that arrangement shown in my above mentioned patent, wherein the light beam is projected through the record strip at an angle. Improved reproduction is obtained in the arrangement of the present invention, and distortion is reduced to a minimum.

Shifting of the scanning light beam from one sound track to the other is similarly accomplished in the present invention by the utilization of a plurality of masking elements 53 which are supported for longitudinal shifting movements upon a suitable bracket support 54. These masking elements are respectively connected to actuating levers 55 which are individually operable by electro-magnetic means contained within a housing 56 on the rear side of panel 11. Each masking element 53 has an opening 57 therein, which opening is normally disposed to one side of the axis 52 of the scanning light beam, but which upon longitudinal movement of the masking element, as determined by suitable control, will be moved to such position as to permit the passage of the light scanning beam therethrough. Since the respective masking elements are laterally staggered as shown in Fig. 2, the passage of the scanning light beam through a particular sound track to be transcribed is readily controlled.

By constructing the drum 17 with the respective drum ends 26—26 in spaced apart relation, space is provided within the drum periphery within which a prism assembly 58 may be supported from a suspension bracket 59. The prism assembly 58 is of conventional construction and constitutes a light divider which serves to separate the scanning beam passing along the single axis 52 into portions passing along parallel axes 59' and 60 to individual photo-electric cells 61 and 62, respectively. By dividing the scanning beam in this manner, one of the photo-electric cells may be utilized in conventional manner with reproducing circuits, and the other photo-electric cell may be connected into control circuits arranged to be responsive to a characteristic of the sound track, as explained in detail in my heretofore mentioned co-pending application.

The record strip 18 may be fed from suitable reels to the drum 17, tension roller assemblies 63—63 being positioned at the points of entrance and exit of the record strip with respect to the drum 17.

Switching means 64—64 are associated with each tension roller assembly 63 for determining reversals of the driving means for the drum 17 in accordance with a characteristic of the record strip. In the present instance, for illustrative purposes, the switching means 64, as shown in Fig. 5, comprises an actuating member 65 supported in the switch structure for longitudinal movement. This actuating member is engaged by a pivotally mounted arm 66 having a roller 67 at its free end for engaging the record strip, in this case the edge of the strip. A spring 68 normally biases the roller 67 toward the record strip. Normally, the movement of the arm 66 under the influence of the spring 68 is opposed by engagement of the roller against the adjacent strip edge, but upon the passage of an edge groove or indentation 69 formed in the strip, the movement of arm 66 will take place in such manner as to move the actuating member 65 so as to operate the switch. While a specific manner of actuating the switch means has been illustrated, it is contemplated that the switch means might be actuated by other characteristics of the record strip, as for example, a strip characteristic which might produce photo-electric response.

I claim:

1. Sound reproducing apparatus, comprising: a hollow drum mounted on a hollow shaft and having axially spaced cylindrical surfaces for engaging the edge margins of said strip; suction ports formed in said surfaces; means for supplying suction to said shaft; a disc member at each end of the drum having an outer circle and inner circle of openings extending through said member and forming radially aligned sets respectively composed of an opening in each circle, the openings of the outer circle having their inner ends in communication with said suction ports and the openings in the inner circle having their inner ends in communication with said hollow shaft; and a valve member in face engagement with the outer surface of each disc member supported for relative movement thereto, said valve member having a face portion for shutting-off communication between the outer ends of certain sets of said openings, and containing a channel for establishing communication between the outer ends of certain other sets of said openings during said relative movement.

2. Sound reproducing apparatus, comprising: a hollow drum mounted on a hollow shaft and having axially spaced cylindrical surfaces for engaging the edge margins of said strip; suction ports formed in said surfaces; means for supplying suction to said shaft; and means including a valve for disconnecting the suction ports lying within a 60° angle, and connecting the suction ports lying within a 300° angle with respect to the shaft axis.

3. Sound reproducing apparatus, comprising: a rotatably driven hollow drum having spaced cylindrical peripheral surfaces for engaging said strip; suction ports formed in said surfaces; and valve means for deactivating the suction ports as they enter a predetermined section of the path of movement of said surfaces, and activating the suction ports leaving said section.

4. Sound reproducing apparatus, comprising: a rotatably driven hollow drum having spaced cylindrical peripheral surfaces for engaging said strip; suction ports formed in said surfaces; and valve means for cutting-off the suction ports lying within a portion of the path of movement of said surface.

5. In a device of the character described, wherein a record strip is longitudinally advanced: a rotatably mounted drum having a cylindrical surface peripherally engageable along a portion of its path of movement with a surface of said strip; pneumatic means for applying a pressure in a direction to force said strip towards said cylindrical surface; and means confining the action of said pressure to said portion of the path of movement.

6. In a device of the character described, wherein a record strip is longitudinally advanced: a rotatably mounted drum having a cylindrical surface peripherally engageable along a portion of its path of movement with a surface of said strip; pneumatic means for applying a pressure in a direction to force said strip towards said cylindrical surface; and means rendering said pneumatic means ineffectual with respect to that portion of said path of movement in which said cylindrical surface is out of engagement with said strip surface.

7. Sound reproducing apparatus, comprising: a driven member having a surface area adapted during a portion of its movement to engage a marginal edge surface area of the strip; pneumatic means forcing said engaged areas into pressure contact, whereby movement of said member is imparted to the strip; and means for rendering said pneumatic means ineffectual in an end zone of said portion of movement to enable separation of said engaged areas.

8. Apparatus of the character described, comprising: a rotatably mounted hollow drum for movably supporting a record strip having a sound track thereon; a plurality of pick-up devices on one side of said drum; means positioned on the opposite side of the drum for projecting a single scanning beam on said track in a direction toward the drum axis, while the strip is on the drum; and means positioned within the drum periphery for dividing the beam and redirecting it into two parallel full image beams respectively passing on opposite sides of the drum axis to said pick-up devices.

9. Apparatus of the character described, comprising: a rotatably driven hollow drum having spaced cylindrical peripheral surfaces for engaging the lateral edge margins of a record strip having a sound track thereon; suction means in said peripheral surfaces connecting the drum and strip for unitary movement in a portion of the drum periphery; means for projecting a sound track scanning beam through the strip in said portion of the drum periphery, said beam axis being directed toward the drum axis on a radius thereof; a plurality of pick-up devices on the opposite side of the drum axis from the projecting means; and means between the strip in said portion of the drum periphery and the drum axis for dividing said beam into separate parallel beams outwardly spaced from the drum axis and directed to the respective pick-up devices.

10. Apparatus of the character described, comprising: a rotatably driven hollow drum having spaced cylindrical peripheral surfaces for engaging a record strip having a sound track thereon; means for guiding said record strip for entrance on and exit from the drum at spaced points in the drum periphery; suction means in said peripheral surfaces for gripping the strip edge margins while on the drum so that the drum drives the strip; means for projecting a sound track scanning beam through the strip, while on the drum, in a direction radially of the drum and toward its axis; optical means between the record strip and drum axis in the space between said cylindrical peripheral surfaces for intercepting and dividing said beam into a plurality of beams in parallel air paths passing between said spaced points in the portion of the drum periphery which is not engaged by the record strip; and pick-up devices respectively activated by said plurality of beams.

11. Apparatus of the character described, comprising: a rotatably driven hollow drum having spaced cylindrical peripheral surfaces for engaging the edge margins of a record strip having a sound track thereon; means for guiding said record strip for entrance on and exit from the drum at spaced points in the drum periphery; suction means for gripping the strip along its marginal edges while on the drum so that the drum drives the strip; means for projecting a sound track scanning beam through the strip, while on the drum, in a direction radially of the drum and toward its axis; optical means in the space between the record strip and drum axis and between said peripheral surfaces for intercepting and dividing said beam into a plurality of beams passing between said spaced points in the portion of the drum periphery which is not engaged by the record strip; pick-up devices respectively activated by said plurality of beams; and means responsive to longitudinal movement of the record strip for reversing the driving direction of said drum.

12. Apparatus of the character described, comprising: a rotatably driven hollow drum having spaced cylindrical peripheral surfaces, for engaging a record strip having a sound track thereon; means for guiding said record strip for entrance on and exit from the drum at spaced points in the drum periphery; suction means in said peripheral surfaces for gripping the strip edge margins while on the drum so that the drum drives the strip; means for projecting a sound track scanning beam through the strip, while on the drum, in a direction radially of the drum and toward its axis; an elongate support projecting into the space between said peripheral surfaces; optical means within the drum periphery carried by said support, and having parts for receiving said scanning beam and separating it into parallel beams projected through the air on opposite sides of the drum axis in a direction passing between said spaced points in the portion of the drum periphery which is not engaged by the record strip; and pick-up devices respectively activated by said latter parallel beams.

FERENZ H. FODOR.

REFERENCES CITED

The following references are of record in the file of this patent:

UNITED STATES PATENTS

| Number | Name | Date |
|---|---|---|
| 1,629,154 | Ybarrando | May 17, 1927 |
| 1,859,435 | De Forest | May 24, 1932 |
| 2,002,352 | Owens | May 21, 1935 |
| 2,093,490 | Schwartz | Sept. 21, 1937 |
| 2,111,066 | Gorlich | Mar. 15, 1938 |
| 2,254,478 | Fodor | Sept. 2, 1941 |